Sept. 2, 1947.  P. HALPERT ET AL  2,426,608
CONTROL UNIT FOR HYDRAULIC SERVOMOTORS
Filed July 8, 1942  3 Sheets-Sheet 1
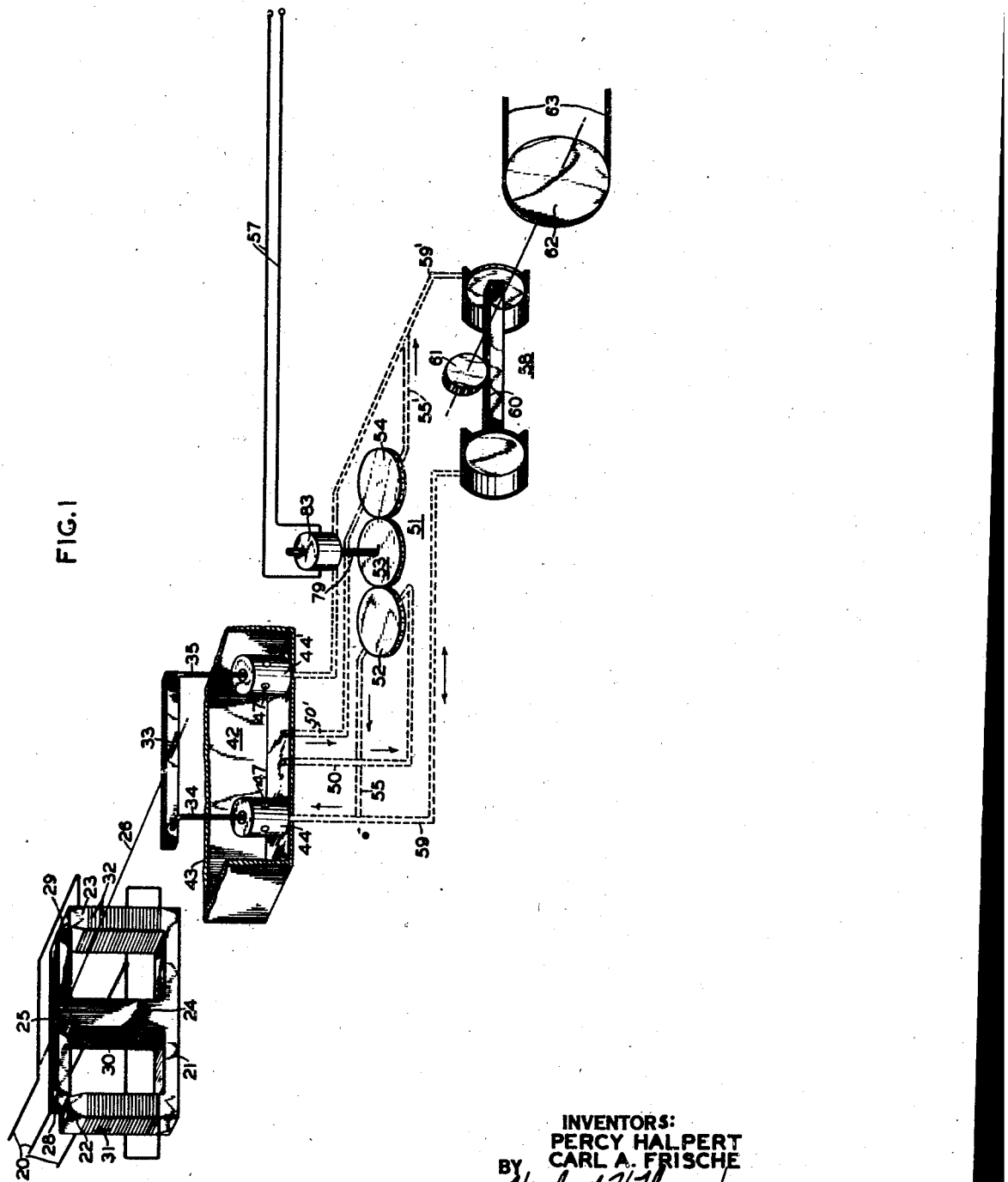
INVENTORS:
PERCY HALPERT
CARL A. FRISCHE
BY
Herbert H. Thompson
their ATTORNEY

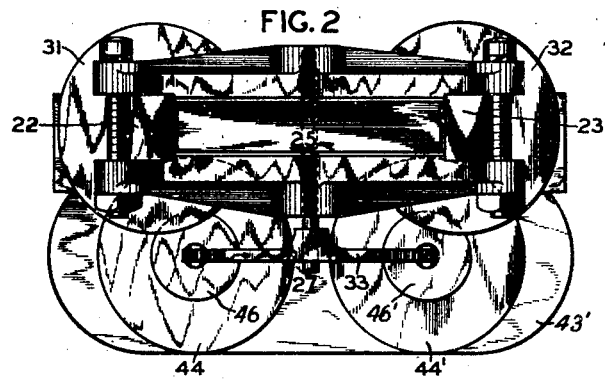
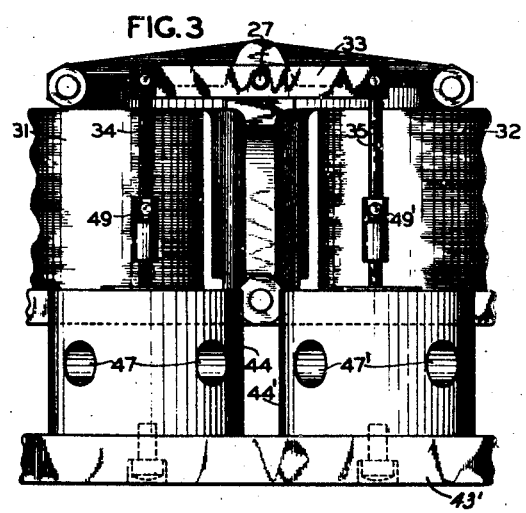
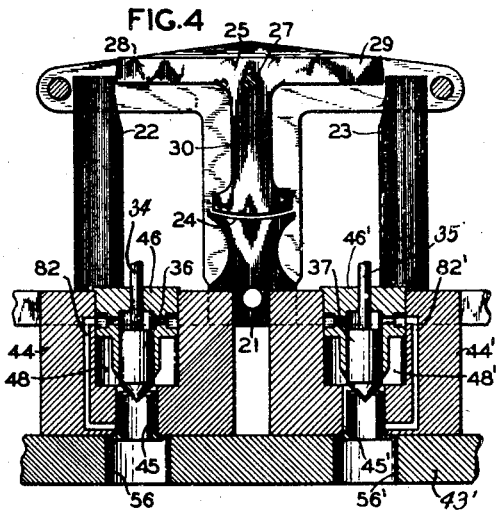
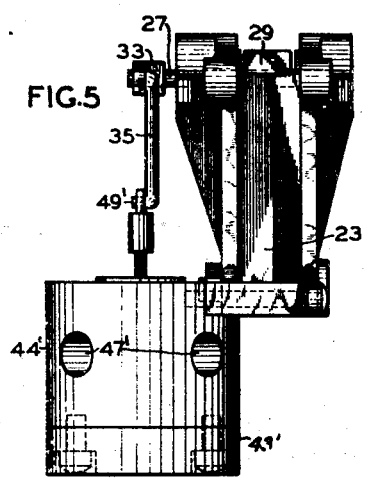
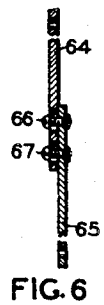
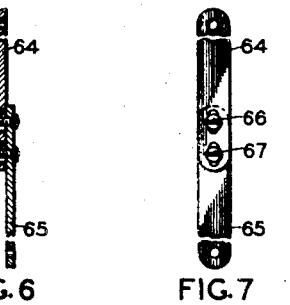
INVENTORS:
PERCY HALPERT
CARL A. FRISCHE
BY
ATTORNEY

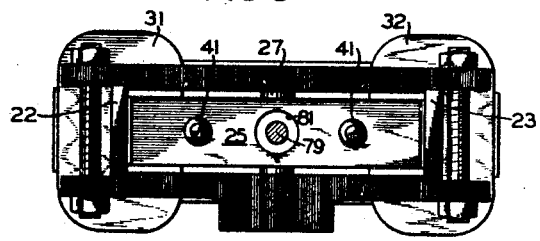
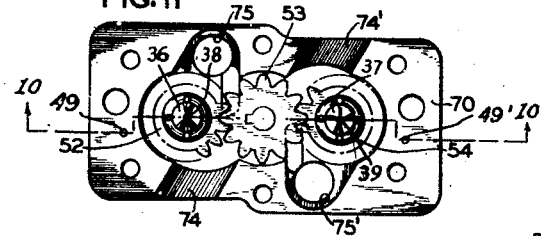
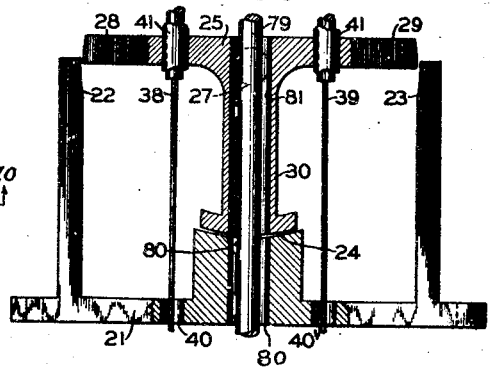
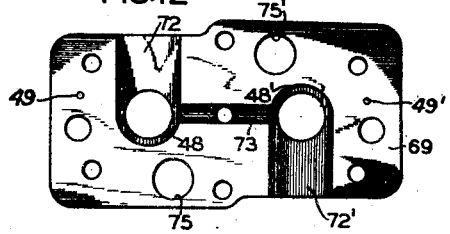
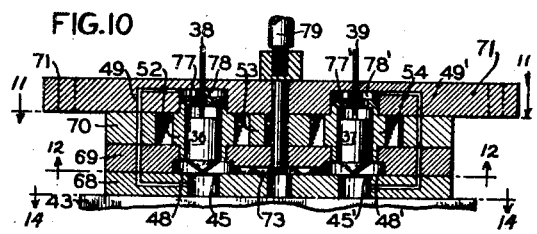
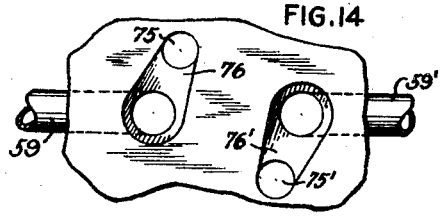
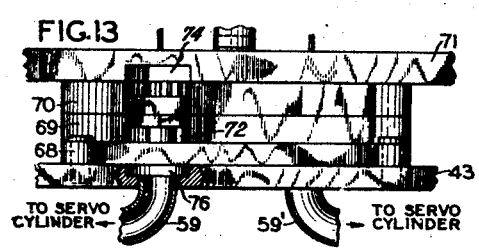

Patented Sept. 2, 1947

2,426,608

UNITED STATES PATENT OFFICE 2,426,608

CONTROL UNIT FOR HYDRAULIC SERVOMOTORS

Percy Halpert, Kew Gardens, and Carl A. Frische, Great Neck, N. Y., assignors to Sperry Gyroscope Company, Inc., Brooklyn, N. Y., a corporation of New York Application July 8, 1942, Serial No. 450,212

5 Claims. (Cl. 103—41)

This invention relates to a control unit for hydraulic servomotors. More specifically the control unit constructed in accordance with the present invention has particular utility when incorporated for use in a follow-up electro-hydraulic control system for automatically piloting aircraft and the like of the character shown and described in U. S. Letters Patent No. 2,398,421, issued April 16, 1946, to Carl A. Frische, George P. Bentley and Percy Halpert. The novel subject matter of the present application particularly concerns the portion of a complete control system of the character referred to which includes the torque motor or electrical controller, the differentially effective pair of valves by which operation of the hydraulic servomotor is controlled, and the pump.

One of the features of the invention is contained in the novel arrangement of the electrical controller and the controlling pair of valves for the hydraulic servomotor or control device.

Still a further feature of the invention is contained in the arranged combination in the control unit of the electric controller, the valve parts, and the pump.

Other features and structural details of the invention will be apparent from the following description when read in connection with the accompanying drawings, wherein Fig. 1 is a schematic exploded view showing the relationship of the separate elements in a control unit constructed in accordance with the present invention and the arrangement of the same with the hydraulic servomotor.

Fig. 2 is a detail plan view of one of the improved forms of control unit.

Fig. 3 is a front elevation of the unit shown in Fig. 2.

Fig. 4 is a vertical cross-section of the unit illustrated in Fig. 3, with the coils of the electrical controller of the unit removed from position.

Fig. 5 is an end elevation of the unit shown in Figs. 2, 3 and 4.

Fig. 6 is a side elevation showing a detail view of a modified form of valve stem utilized in the improved control unit.

Fig. 7 is a front elevation of the detail parts shown in Fig. 6.

Fig. 8 is a view similar to Fig. 2 showing a modified form of control unit.

Fig. 9 is a detail elevation of the form of electrical controller employed in the modified type of control unit.

Fig. 10 is a detail vertical section taken on lines 10—10, Figs. 11 and 12, through the combined valve and pump housing of the modified unit illustrated in Figs. 8 and 9.

Fig. 11 is a detail plan view looking in the direction of the arrows 11—11, Fig. 10, of the pump utilized in the modified control unit, with the cover plate removed.

Fig. 12 is a detail plan view looking in the direction of the arrows 12—12, Fig. 10, of the bottom of one of the housing plates of the unit showing the channel connecting the valve controlled passageways.

Fig. 13 is a front elevation of the combined valve and pump housing showing the relation of the same with respect to the discharge outlets leading to the hydraulic servomotor, and, Fig. 14 is a detail plan view looking in the direction of the arrows 14—14, Fig. 10, of the base of the sump 42.

With reference particularly to Fig. 1, the parts of a control unit constructed in accordance with the present invention are shown in exploded relation. For purposes of clarity in the description of the unit the individual parts of the same will be considered in the order in which they become effective to control the hydraulic servomotor. The first of these parts is the torque motor or electric controller which develops a torque substantially proportional over its operating range to a differential energy input supplied the same by way of leads 20. A controlling circuit and controller therefor (not shown) of the character shown and described in detail in the aforementioned application for Letters Patent, or other equivalent control arrangements, may be provided for supplying direct current energy to the windings of the torque motor or electric controller.

With reference to Figs. 1, 4 and 9, the electric controller is shown as provided by a three pole type magnetic core and a rockably mounted, three legged, magnetic armature. The core 21 of the motor is formed in the shape of a horseshoe which is provided with two oppositely disposed poles 22—23 and a third pole 24 which is situated at the base of the magnetic core. The armature 25 is mounted to rock about an axis 26 provided by shaft 27. Armature 25, has, in this instance, three legs 28, 29 and 30 which are of equal radial lengths. The armature and core cooperate to provide two branched magnetic circuits in which the pole 24 of the core and the leg 30 of the armature carry the flux of both circuits. Coils 31 and 32 are provided for each of the legs of the core 21, the windings of the same being such as to cause the flux in the armature leg 30 and pole 24 of both magnetic circuits to move in the same direction. The armature of the electric controller has an overall movement of approximately one degree and the cooperating ends of the armature and poles of the core are so designed that the total air gap of the respective circuits remains substantially constant. Two magnetic circuits having a combined reluctance of substantially constant magnitude are consequently provided in the electric controller, the area of the air gap between armature leg 30 and pole 24 remaining fixed while the gaps between respective pole 22-leg 28 and pole 23-leg 29 uniformly increase and decrease in area as the armature moves. Pole 24 is preferably constructed wider than the armature leg 30 by the degree of angular movement permitted the armature. It will be understood that the coils of the controller are differentially energized by suitable input means and when no control signal is present, equal direct currents are supplied to the respective windings of the torque motor which produce an equal number of lines of flux in the two branched magnetic circuits. The degree of saturation of the iron core is such that the balanced operating point of the controller is approximately at the center of the linear portion of the magnetization curve. An input operating signal effectively decreases the lines of flux in one of the branched magnetic circuits and increases the lines of flux in the other. Since the three legged armature tends to assume a position in which the greatest number of lines of flux pass through it, the same moves correspondingly about its axis 26 as the magnitude of the flux in the respective circuits varies. Due to the adjustment of the operating range of the controller to the linear portion of the magnetization curve and the fact that the length of the air gaps remains constant, the torque developed by the controller is substantially proportional to its differential energy input. The armature is consequently moved from a balanced position in push-pull fashion in response to an effective input signal.

With particular reference to Figs. 1, 2, 3 and 5, the armature 25 is shown connected to a rocker 33 which is fixed to an extending portion of the shaft 27. A pair of valve stems 34 and 35 are pivotally mounted at the respective ends of the rocker 33 which serve to position the differentially effective piston type valves 36 and 37 employed in a hydraulic control system of the character described in copending application Serial No. 259,178, filed March 1, 1939, by George P. Bentley and Carl A. Frische. The rocker and valve stem mechanism operates about the axis of the rockably mounted armature of the electrical controller to directly exert control over the control devices or valves 36 and 37.

In the modification of the invention shown in Fig. 9, a pair of flexible valve stems 38 and 39 which extend through openings 40 in the stator or base of the core 21 of the electric controller connect the respective piston type valves 36 and 37 and the armature. The ends of the respective flexible valve stems are suitably fixed to the legs 28 and 29 of the armature by means of coupling members 41. The valve stems 38 and 39 are situated on opposite sides of the axis about which the armature of the electrical controller rocks.

The hydraulic control system employed in connection with the present invention, is shown, in Figs. 1 to 5 inclusive, to include a sump 42 provided by the casing 43 which preferably contains or includes all of the operating parts of the control unit. Valve housings 44—44' are suitably mounted on a common base 43' which is fixed to the sump providing casing 43, and include valve seats 45—45' and cylinder forming bushing members 46—46' which respectively receive the piston type valves 36 and 37 so the same are confined to translational movement under control of the armature 25. Fluid moving past the respective seats of the valves returns directly to the sump 42 by way of openings 47—47' in the individual valve housings 44—44' which communicate with the chambers 48—48'. Rod extensions of the piston type valves 36 and 37 are pivotally connected to the respective valve stems as indicated at 49—49'. As particularly shown in Fig. 5, the electric controller element of the unit is fixed in position on the valve housings 44—44' so that the extending portion of the shaft 27 and the rocker thereon is situated directly above the valves 36 and 37. As provided in the hydraulic system disclosed in application Serial No. 259,178, fluid by-passing or pressure repeat-back channels 82—82' for the respective piston valves are included in the present construction. By-pass channels 82 and 82', Fig. 4, equalize or balance the pressures effective against the respective faces of the piston type valves 36 and 37. The rocker 33 differentially operates the valves 36 and 37 and is self-centering with a zero output signal from the electrical controller so that the pressures in the respective halves of the hydraulic system controlled by the servounit automatically equalize.

The fluid by means of which pressures are transmitted throughout the dual hydraulic system is drawn from the sump 42 through pipes 50—50', Fig. 1, by a double acting three gear type pump 51 whose gears are respectively designated at 52, 53 and 54. The pump unit is also included in the sump providing casing construction. Fluid discharged from the double acting pump is forced through the supply pipe connections 55—55' into the respective passageways 56—56' in the base of the valve housings 44—44' and thence proceeds as previously described, past the respective piston valves to return to the sump. The central gear of the pump is suitably driven by a motor 83 which is supplied with energy from a power source by way of leads 57.

The hydraulic servo unit indicated generally at 58 may also be included as an integral portion of the sump forming casing 43, the respective ends of the servo cylinder communicating with pressure supply pipes 55—55' by way of connecting pipes 59—59'. Movement of the controlled object (not shown) may be effected from the joined piston members of the servo unit through rack 60, gear 61, and pulley member 62 whose cables 63 lead directly to the same.

When the input signal to the electrical controller is such as to cause movement of the armature 25 in a clockwise direction, for example, the same exerts a force through rocker 33 which tends to lower piston valve 37 and raise piston valve 36. This action results in a decrease in the size of the opening between valve 37 and seat 45' and corresponding increase in the size of the opening between valve 36 and seat 45. Consequently for the example chosen, the fluid pressure in pipe or line 55' increases due to further restriction of fluid flow by the valve 37 while the fluid pressure in pipe or line 55 decreases due to the lessening of the restriction of fluid flow by the valve 36 which results in movement of the servopiston, in this instance, towards the left as viewed in Fig. 1, and causes the controlled object to be positioned as desired.

With reference to Figs. 6 and 7, a modified form of valve stem for the electric controller is shown in which the length of the same is made adjustable. This form of stem may be constructed in two parts 64 and 65 which have cooperating pairs of slots through which fastening members 66 and 67 extend.

Referring to Figs. 8 to 13, inclusive, the modified form of control unit illustrated therein shows the pump element and differentially effective piston valves incorporated in a combined pump and valve housing which is fixed to casing 43. The housing includes in this instance a valve seat plate 68, a valve plate 69, a gear plate 70 and a cover plate 71. The respective plates are fixedly mounted upon each other with the base of the core of the electric controller situated on the top of the cover plate 71, the relation of the parts being clearly shown in Figs. 9 and 10. The valve seats 45—45' are, in this instance, directly situated in the apertured plate 68. Chambers 46—46' are contained in the valve plate 69 which also includes, as shown in Fig. 12, passageways 72—72' through which the fluid leaving the valve chambers returns directly to the sump 42. Channel 73 in plate 69 connects the valve chambers 46—46' and provides communication between the respective branches of the servosystem. Plate 70 houses the three gear type pump element, the gears of which are indicated at 52, 53 and 54, in Fig. 11. The respective inlets to the pumps are, in this instance, shown in the form of passageways 74—74'. The outlets provided for the pump are shown in the form of openings 75—75' which are also contained in plates 69 and 68 and lead to channels, respectively indicated at 76 and 76', Fig. 14, in the base of the casing 43. Chamber 76 directly communicates with both the servocylinder by way of pipe 59 and the opening in valve seat housing 68 for seat 45, in this instance.

Gears 52 and 54 of the pump unit are provided with axial bores in which the piston type valves 36 and 37 are mounted to move translationally under control of the flexible valve stems 38 and 39. The valve receiving gears are also provided with apertured hub portions 77—77' at one of the ends thereof which are situated in chambers 78—78' in the cover housing plate 71 of the unit. Pressure equalizing channel connections 49—49' are included between the outlet passageways for the pump, in this instance, in the valve seat housing plate 68 and the respective chambers 78—78' above the apertured hub closures of the axially bored gears 52 and 54. A central boss is provided on the respective gear hubs 77—77' that extends into the chambers 78—78' to the undersurface of the cover plate 71. This reduces the area of the chambers 78—78' so that the effective area of the hub portion of the gears 52 and 54 subject to fluid pressure is also reduced. By this construction axial thrust due to the fluid in chambers 78—78' on the rotating gears 52 and 54 is relieved.

The central gear 53 of the pump in this modified form of control unit is driven by a shaft 79 which extends through a further or third opening 80 in the base of the core 21 and through an opening 81 in the leg 30 of the armature 25 of the electric controller element. Opening 81 is made of sufficient size that the rotating shaft 79 does not interfere with the limited free movement permitted the armature about its axis 26. A control unit such as shown in Figs. 8 to 14 inclusive operates in the following manner. If the automatically self-centering armature 25 moves counterclockwise as viewed in Fig. 9, valve 36 is urged towards its seat in the plate 68 and valve 37 is urged in the opposite direction relative to its seat. This reduces the size of the opening between seat 45 and valve 36. The fluid flow through the unit is consequently restricted in this branch of the unit. The sequence of fluid flow in this branch of the unit is sump 42 to pump by way of channel 74, to opening 75 and to channel 76. From channel 76, the fluid flows to the servocylinder by way of pipe 59 and also flows through the opening in the valve seat plate 68 by the valve 36 and returns to the sump by way of the channel 72. Due to the restriction in the opening between valve 36 and its seat, less fluid returns to the sump and the pressure in pipe 59 rises. A reverse action takes place in the other branch of the hydraulic system under control of valve 37 in which for the example chosen the size of the opening between the valve and its seat 45' increases. This increases the flow of fluid to the sump by way of channel 72' and reduces the pressure in the pipe 59'.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The combination in a servomotor control unit of, a casing, a combined pump and valve housing fixed to the casing, a pump located in said housing, a shaft by which said pump is driven, a pair of translatably mounted valves in said housing, said valves being severally connected through discharge lines from the pump to a servomotor and adapted to be differentially positioned whereby to increase discharge pressure through one valve and discharge line and correspondingly reduce pressure through the other valve and discharge line and effect operation of the servomotor, an electrical controller including a magnetic core and a rockably mounted armature operable to position said valves, said core being fixed to said valve housing and having an opening therein, said armature having an opening therein in aligned relation to the opening in said core, said pump driving shaft extending through the respective openings in said core and armature, and coil means on said core.

2. The combination in a servomotor control unit of, a casing, a combined pump and valve housing fixed to said casing, a three gear pump located in said housing, two of the gears of which are axially bored and include apertured hub closures at one of the ends thereof, means for driving said pump, a pair of piston type valves mounted for translational movement in the bores of the pump gears, said valves being severally connected through discharge lines from the pump to a servomotor and adapted to be differentially positioned whereby to increase discharge pressure through one valve and discharge line and correspondingly reduce pressure through the other valve and discharge line and effect operation of the servomotor, means for differentially operating said valves, and a pair of channels in said housing for equalizing the pressures on the respective ends of the piston type valves, said channels leading to an opening in the housing situated adjacent to the respective apertured hub closures of the gears.

3. The combination claimed in claim 2, in which the axially bored gears include a boss on the apertured hub closure portion thereof.

4. The combination in a control unit of a casing, an electrical stator having two openings therein and adapted to be mounted on said casing, an armature cooperating with said stator and rockably mounted on said casing, a first flexible stem extending through one of said openings having one end thereof fixedly connected to the armature to one side of its axis and the other end thereof adapted to be connected to a control device, and a second flexible stem extending through the other of said openings and having one end thereof fixedly connected to the armature to the other side of its axis and the other end adapted to be connected to a second control device.

5. A control unit as claimed in claim 4, in which said stator has three magnetic poles and said armature is T-shaped.

PERCY HALPERT.
CARL A. FRISCHE.

REFERENCES CITED

The following references are of record in the file of this patent:

UNITED STATES PATENTS

| Number | Name | Date |
| --- | --- | --- |
| 1,962,898 | Emmerling | June 12, 1934 |
| 1,648,674 | Carichoff | Nov. 8, 1927 |
| 1,161,819 | Crob | Nov. 23, 1915 |
| 1,963,750 | Lazich et al. | June 19, 1934 |
| 2,108,498 | McLeod | Feb. 15, 1938 |
| 2,274,734 | Esnault-Pelterie | Mar. 3, 1942 |
| 1,161,819 | Grob | Nov. 23, 1915 |
| 2,254,411 | Ashworth | Sept. 2, 1941 |

FOREIGN PATENTS

| Number | Country | Date |
| --- | --- | --- |
| 577,814 | France | June 13, 1924 |
| 482,102 | Germany | Nov. 11, 1929 |
| 412,534 | Germany | Apr. 23, 1925 |
| 19,484 | Switzerland | Feb. 26, 1900 |
| 445,351 | Great Britain | Apr. 6, 1936 |

OTHER REFERENCES

A. P. C. publication of Wünsch, Ser. No. 366,364, published Apr. 27, 1943.

Ser. No. 366,364, Wünsch (A. P. C.), published April 27, 1943.